Nov. 8, 1932.  C. FIELD  1,886,663
WIRE CUTTING MACHINE AND TENSION REGULATOR THEREFOR
Original Filed June 18, 1927    7 Sheets-Sheet 1

INVENTOR
*Crosby Field*
BY
*George A. Dean* ATTORNEY

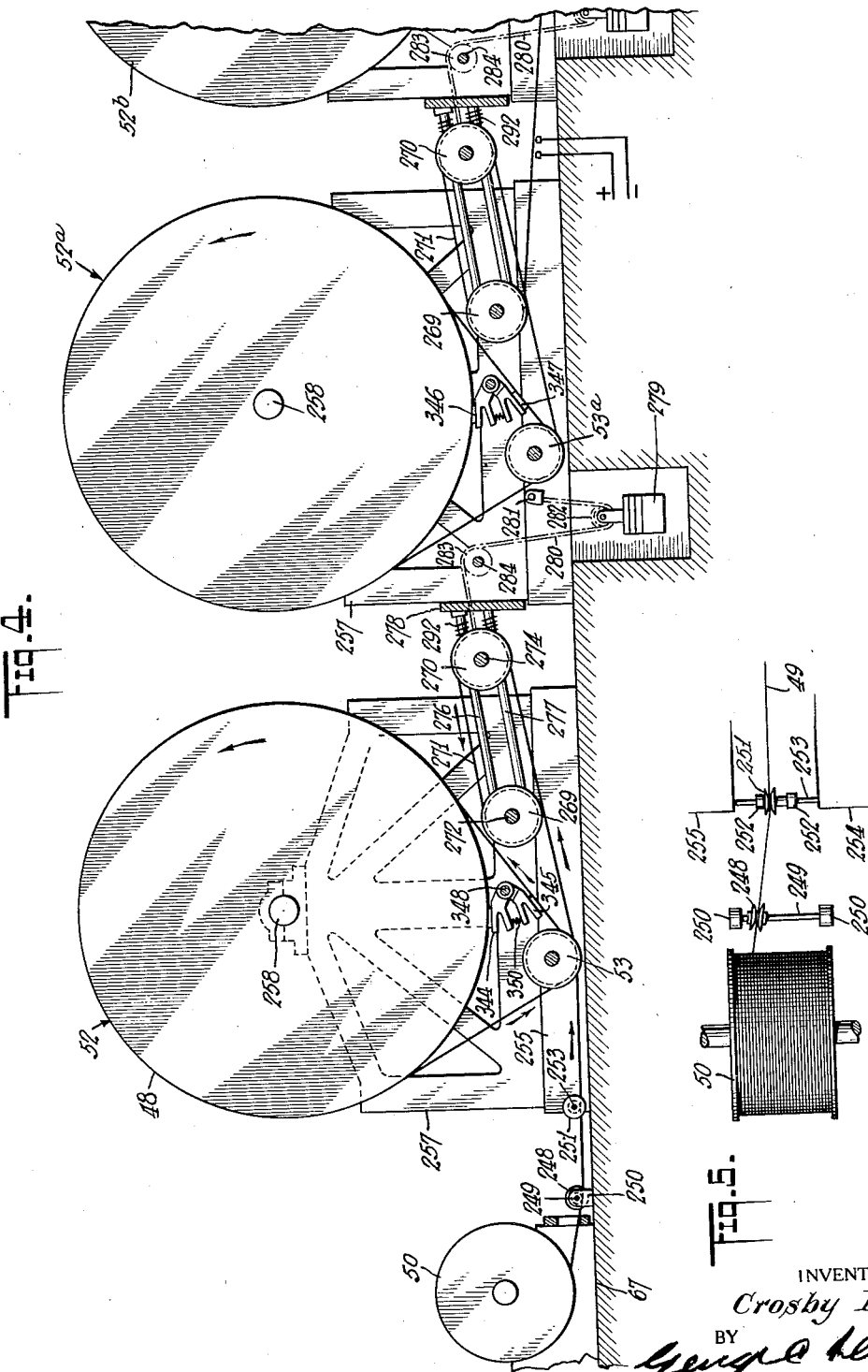

Nov. 8, 1932.   C. FIELD   1,886,663
WIRE CUTTING MACHINE AND TENSION REGULATOR THEREFOR
Original Filed June 18, 1927   7 Sheets-Sheet 3

INVENTOR
Crosby Field
BY
George A. Alcan ATTORNEY

Nov. 8, 1932.　　　　　C. FIELD　　　　1,886,663
WIRE CUTTING MACHINE AND TENSION REGULATOR THEREFOR
Original Filed June 18, 1927　　7 Sheets-Sheet 5

INVENTOR
*Crosby Field*
BY
*George C. Shean*
ATTORNEY

Nov. 8, 1932. C. FIELD 1,886,663
WIRE CUTTING MACHINE AND TENSION REGULATOR THEREFOR
Original Filed June 18, 1927 7 Sheets-Sheet 6

INVENTOR
Crosby Field
BY
George C. Weare
ATTORNEY

Nov. 8, 1932.  C. FIELD  1,886,663

WIRE CUTTING MACHINE AND TENSION REGULATOR THEREFOR

Original Filed June 18, 1927   7 Sheets-Sheet 7

INVENTOR
Crosby Field
BY
George C. Dean
ATTORNEY

Patented Nov. 8, 1932

1,886,663

UNITED STATES PATENT OFFICE

CROSBY FIELD, OF BROOKLYN, NEW YORK, ASSIGNOR TO BRILLO MANUFACTURING COMPANY, INC., A CORPORATION OF NEW YORK

WIRE CUTTING MACHINE AND TENSION REGULATOR THEREFOR

Original application filed June 18, 1927, Serial No. 199,692. Divided and this application filed August 3, 1928. Serial No. 297,315.

My present invention is set forth in my copending application, Ser. No. 199,692, filed June 18, 1927, of which this case is a division. As in that case, the invention relates to automatic machines for producing metal wool and many of its important features are in the nature of improvements which may be used with or in place of related apparatus and parts disclosed in my Patents Nos. 1,608,478 and 1,608,481, dated November 23, 1926. In these machines, wire is drawn from a suitable source and is conducted through a series of successively arranged cutting or shaving units which operate upon the wire to produce the metal wool. In the preferred case, the wire from the last of these units is too thin to withstand the strain of shaving and is conducted to a reel on which it is wound in a coil to be disposed of as waste. Each of the cutting units includes a power driven, rotary bed in the form of a disc wheel having a plurality of adjacent grooves, formed in its periphery, in which the wire is held by friction in a plurality of parallel loops or strands and is carried by the wheel in operative relation to a series of cutters arranged around the periphery of the bed. As the wire leaves the last groove of each bed, it passes to the next succeeding bed where it enters the first groove thereof. Preferably, the wire passes in the loops and between the units, in single direction curves of greater or less radius but without reverse bending at any point.

Provision is made in the present invention to wrap the wire around a greater portion of each bed, substantially in advance of the first knife. The means which transfers the loops of wire from one bed groove to another includes a single guide roller beneath each bed. The guide roller has parallel grooves corresponding with and in the same plane as the bed grooves, and the path of the wire is such that each length travelling from a roller to a bed groove lies in the same radial plane with the roller and bed groove, while each strand travelling from the bed to the guide roller slants across the radial planes.

The spaces between the grooves of the bed are considerably greater than in my prior machines, so that contact of the wires of the adjacent loops is avoided. This affords opportunity for the wires more readily to center themselves under the guidance of the guide roller and to retain their flat or cut surfaces parallel. By the increased separation of the grooves, the flanges between them can be made thicker and accordingly they wear much longer. By having the grooves in the bed thus separated, the adjacent strands of wire and the periphery of the bed including the grooves, may be readily cleaned of dust or shavings which would otherwise interfere with the operation of the machine.

I prefer to employ means for cleaning the wire and the periphery of the beds including the grooves therein, consisting of wipers to engage the bed and also adjacent strands of wire on the sides which engage in the grooves. Such wipers may be located in that portion of the loop which extends from the wheel bed to the guide roller. Preferably, they are pivotally supported and spring pressed, one against the periphery of the bed wheel and the other against the wire. Thus all dust and shavings are removed from the periphery of the bed wheel and from the wires. The adjacent strands of wire being a considerable distance from each other and the wipers of comparatively soft material such as felt, the latter may extend a considerable distance around each strand for effective cleaning.

Another feature which is intimately related in the combination herein claimed, is having the diameter and corresponding peripheral length for each bed groove on each wheel, greater than for the preceding groove not only to keep the cut surfaces up to the same level across the periphery, but also to keep the intermediate loops tight on the wheel beds in spite of minute stretching by the 40 to 60 shaving knives that operate on each loop.

In this combination, my present invention including the take-up mechanism hereinafter described, operates to keep the end tension on the wire of each wheel closely limited to that necessary to keep only the first and last loop portions in proper non-slip engagement with the grooves. This is important, though the difference in circumference between any two adjacent grooves is slight.

The take up also operates to prevent undue stress on the wires between successive cutting units, and is preferably employed in combination with means for keeping the bed wheels rotating at the same peripheral speed. Preferably, the take up is elastic to permit momentary slight difference in speed, as when the speed of a preceding bed is decreased as by increase in its load, such as may result from variation in the quality of different parts of the wire being operated upon. The speed controlling means for that purpose may include guide rollers arranged to form elastically tensioned loops in the wire between successive wheels. Any variation in the speeds of adjacent bed wheels is effective to change the tension of the loop, and this is utilized to change the position of the loop forming guide roller, preferably causing the guide roller to slide in the plane of the loop, permitting the latter to lengthen and shorten within limits, maintaining approximately constant tension on the wire. This to and fro bodily movement of the guide roller or "dancer" roller is utilized to operate suitable mechanism to cause corrective change in the speed of one of the adjacent wheel beds. In the present form of the invention, each bed is driven by an electric motor, and each motor is controlled by a rheostat. The rheostat associated with the motor of the first bed may be hand adjusted or permanently fixed, while those associated with the motors of the succeeding beds are automatically controlled by the respective loops and dancer rollers in advance thereof. The mechanism operated by the dancer roller may include a chain extending over a sprocket wheel and operable against a suitable weight, the sprocket wheel being connected to a shaft rotated thereby, which shaft in turn is geared to the motor rheostat to adjust it.

As in my patents referred to, the knives which produce the shavings or wool are pivotally mounted and yieldingly held against the wire, preferably by suitably arranged weights adapted to counterbalance the thrust of the wire against the grooving edge of the knife. All pivotal movements of the knife are damped by inertia and friction so that chattering is prevented and, in normal operation, the knife is self-gauging as to depth of cut, smoothly floating on the wire which it is cutting. However, the wire sometimes has hard spots due to slag or other defects in manufacture. When such a hard spot reaches a cutter, the increased rearward thrust causes the knife to rise entirely out of contact with the wire instead of digging and cutting it off. As claimed more specifically in said copending applications, I employ means for shaving off such uncut or defectively cut hard portions before the wire again passes under the knives. This is preferably a special planing cutter arranged in advance of each set of grooving cutters and adjusted so that it is ineffective so long as the grooving cutters operate normally to shave off the normal thickness of metal. When the grooving cutters begin to jump, the attendant throws them out of action and the special cutter becomes effective for shaving off the excess thickness of wire until the hard spot has passed and the grooving knives again put in operation. During any such operations, the take up control is of special importance in taking care of the attendant variations in load on different units, due to the fact that the single knife replacing the wool cutting knives, is straight edged for the purpose of planing from each strand of wire, a flat ribbon-like shaving as contrasted with the great multiplicity of thread-like shavings from many multiple grooved wool producing cutters.

The above and other features of the combination herein claimed may be more fully understood from the following description in connection with the accompanying drawings, in which Fig. 1 is a diagrammatic front elevation of the machine;

Fig. 4 is a sectional front elevation of the entrance end of the machine showing the path of the wire and the means for automatically controlling the speed of the beds;

Fig. 5 is a detail top plan view showing the manner of guiding the wire from the supply reel to the shaving machine;

Figure 1:
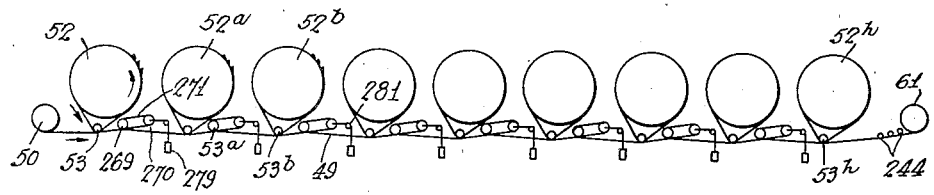
Figure 3:
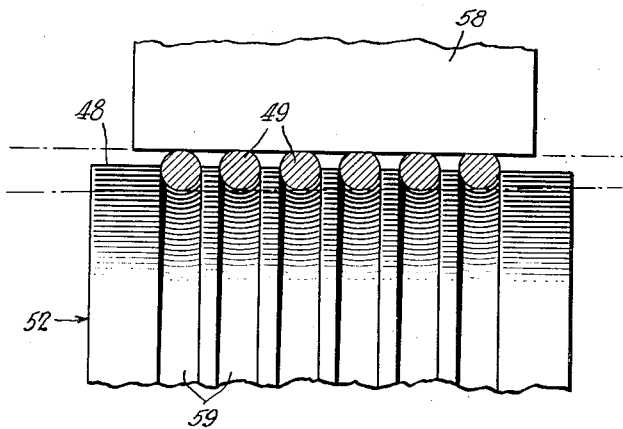
Fig. 3 is a detailed view showing the adjacent strands of wire in their respective grooves of the bed and their relation to the knife.

As shown in these drawings, the machine is one in which a single wire 49 (Fig. 1) is conducted in single curvature loops, without reverse bending, from a supply reel 50 (Figs. 1 and 4) through one or a succession of cutting units. The first unit includes a cylindrical bed 48 formed in the periphery of a traction wheel or disc 52, which is power driven in a manner hereinafter described. The wire is looped a number of times around the traction wheel 52 and a transfer guide roller 53, in successive parallel grooves 59, 60, and is then conducted to the next cutting unit by suitable guide means including roller 270, which, as hereinafter described, regulates the speed of the next succeeding wheel bed 52a, in accordance with the speed of said first bed. The wire passes in a loop around said take up roller 270 and back around another roller 269, which is preferably non-slidable, whence it passes under the transfer guide roller 53a of said succeeding wheel bed 52a. The wire is then looped around the bed 52a and said transfer roller 53a a number of times, and is then looped around a third bed 52b and its transfer roller 53b and so on through as many cutting units as desired. Knives or cutters, 58, (Fig. 10) are arranged in series around the upper half of the periphery of each bed and extend transversely of the bed, so that each knife edge operates simultaneously on the adjacent loops or strands of the wire 49. The loops or strands lie in grooves, 59, formed in the periphery of the bed, as indicated in Fig. 3. These grooves constitute cutter beds supporting the wire in operative position for shaving by the knives. Each bed wheel is rotated in a direction to carry the wire in one direction loops, without reverse bending, as indicated by arrows in Figs. 1 and 4, so that the upper halves of the loops advance against the edges of the knives while traveling toward the supply end of the machine. The knives being grooved, as in my above mentioned patents, present V-toothed edges to the wire and these operate to cut from the wire a series of separate fiber-like lengths constituting the metal wool product of the machine.

Figure 13:
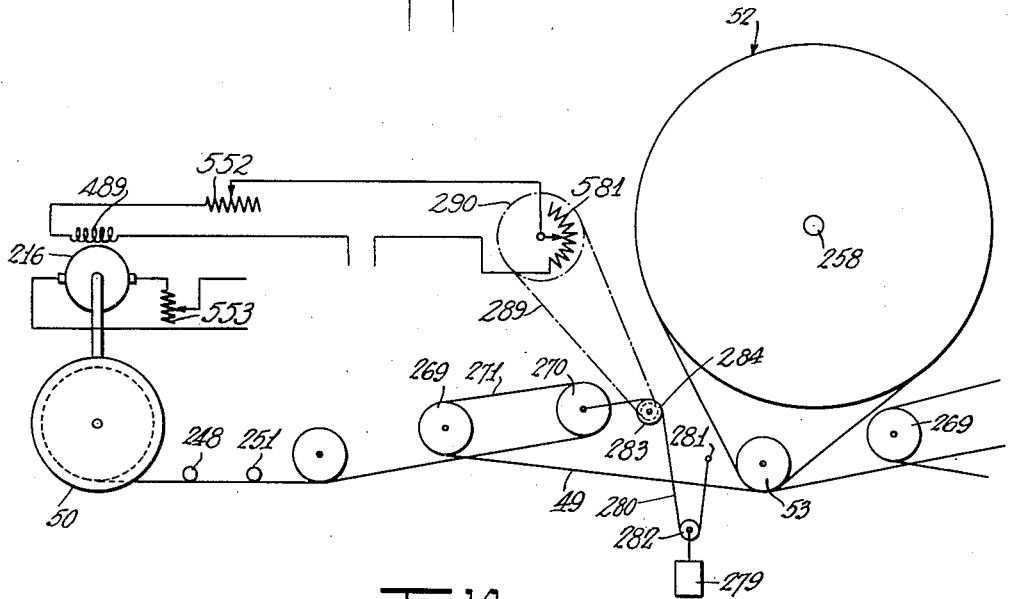
Fig. 13 is a diagrammatic view illustrating the means for automatic control of the tension for the supply reel.
Figure 14:
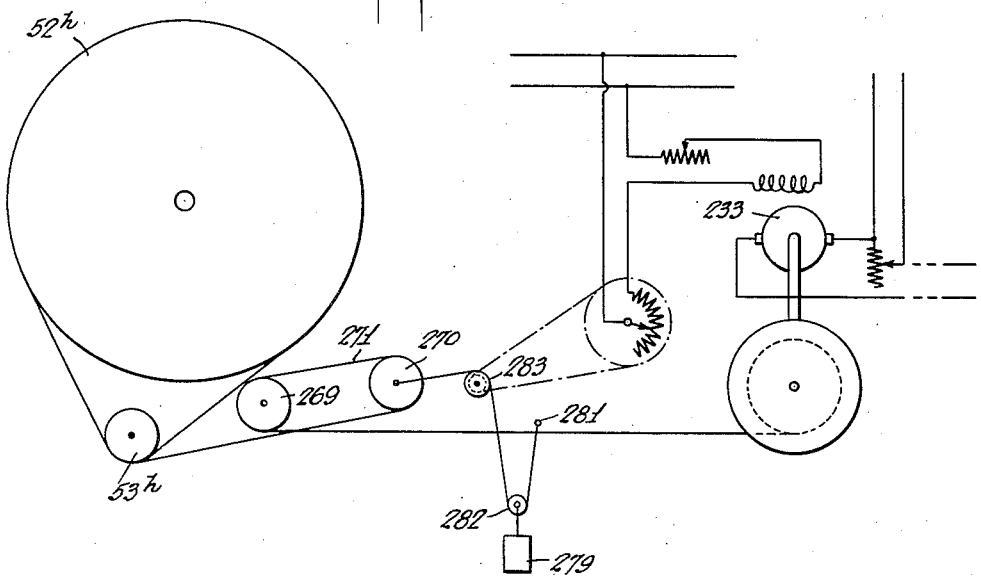
Fig. 14 is a similar view of the tension control for the scrap winding reel at the exit end of the machine.

Referring to Figure 13, it will be noted that a motor 216 is associated with the supply reel 50, it being operatively connected to the shaft thereof. The motor 216 operates as a generator by being run backwards while the wire is being drawn from the reel 50 into the shaving machine, and thus produces a braking action on the supply reel 50 to provide necessary tension in the wire as it is unwound from said supply reel. There is connected in series with the field 489 of motor 216, a manually operated rheostat 552. A variable rheostat 553 is connected across the armature of the motor 216 to vary the braking effect thereof. The rheostats 552 and 553 may be suitably adjusted to determine the normal braking effect of the motor 216 upon the supply reel 50, to produce the desired tension upon the wire 49 between the supply reel and the first bed wheel 52.

Figure 2:
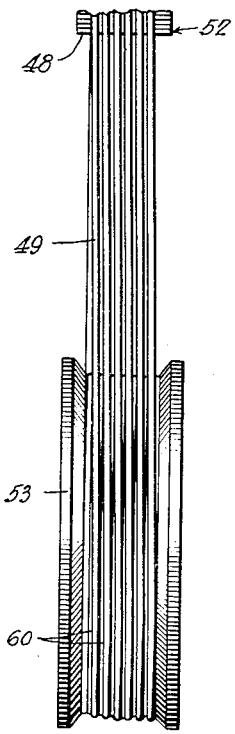
Fig. 2 is an end view showing the loops of wire extending from the cylindrical bed to a roller beneath said bed for transferring the wire from one groove to another of the bed.
Figure 9:
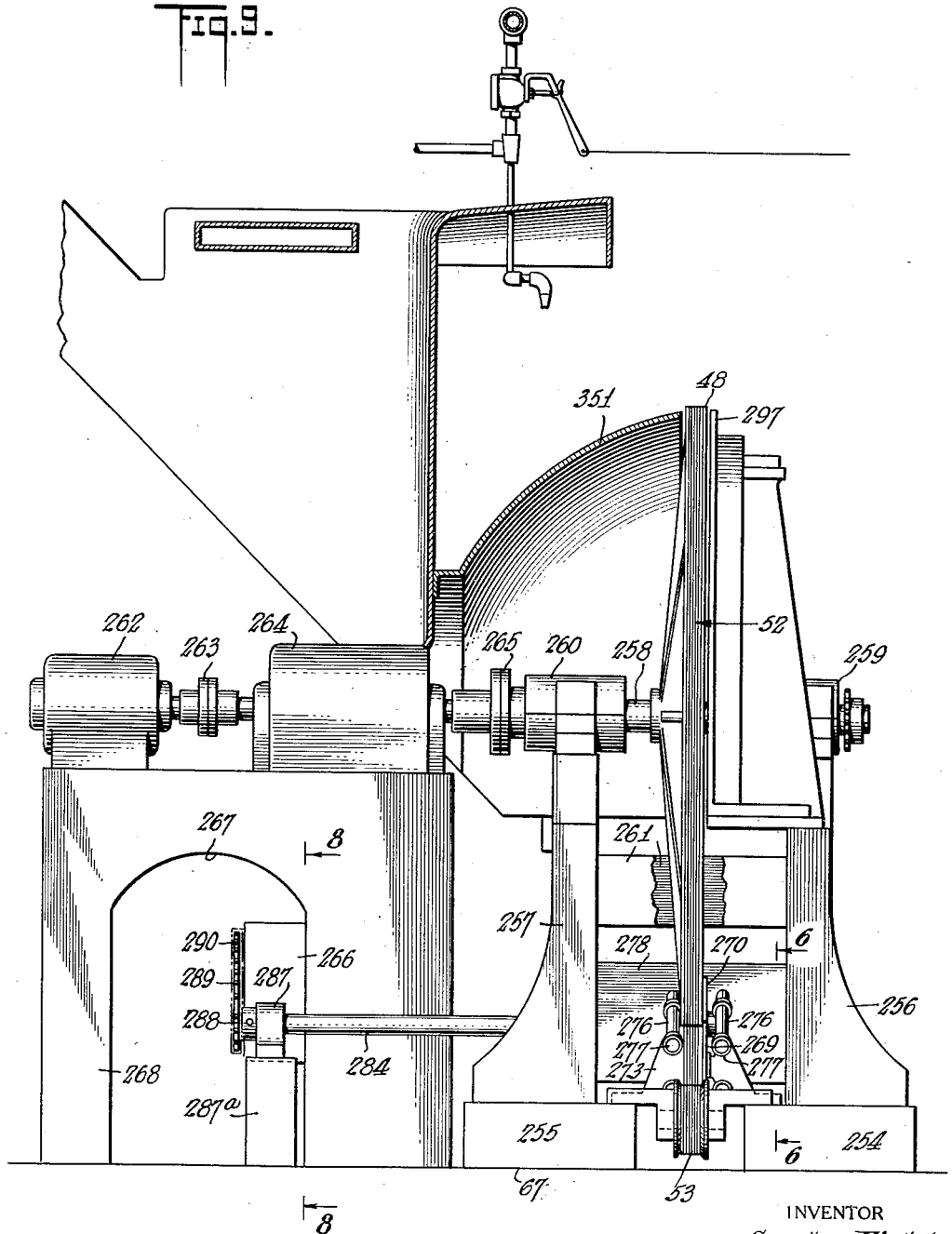
Fig. 9 is an end view of one of the cutting units showing also the wool collecting hood and the means for removing the smoke and dust from the room.

The wire, in passing into the machine, is conducted to the first bed groove of the wheel, this being the groove at the extreme left in Figs. 3 and 9. As the loop of wire passes down from said groove to the transfer guide roller 53, it slants over (Fig. 2) and enters a second groove of the series of grooves 60. Said second groove of the transfer roller lies in the same plane as the second groove 59 of the bed wheel, so that the wire in passing back to the wheel from the guide roller 53, is conducted in a plane registering with the second groove 59 of said wheel 52.

Each time the wire is looped around the wheel bed, it is exposed to the cutting edges of all the knives 58, say 40 to 60 or more in number, and accordingly the wire becomes thinner as it advances through the successive loop paths from the first or entrance groove toward the front or exit groove of the bed, that is, from left to right in Fig. 3. In order to have each cutting edge operate simultaneously on the successively thinned strands, it is necessary to have the successive bed grooves and the cutting edge of the knife correspondingly nearer to each other, so that the space at the right (Fig. 3) is less than at the left.

I prefer to obtain the gradual decrease in space between the effective surfaces of the beds and the cutting edge of the knife by having the successive bed surfaces formed on circles of successively greater diameter, and if the wheel periphery is approximately cylindrical, this results in decreasing depths for the successive grooves 59. This permits having the cutting edge of each knife 58 arranged to operate substantially in the surface of a cylinder of appropriately larger diameter and, in most cases, approximately parallel with the axis of the bed shaft 52. With this arrangement of decreased depth of the grooves 59, the metal is removed across a cylindrical surface exactly transverse to the lengthwise curvature of the wire so that as the wire becomes flatter, it naturally continues to do all its bending and straightening in the same plane in which it was bent and set by the first groove of the machine, whereas an inclined cut surface would cause a twisting resultant for every change in curvature. As the wire 49 advances successively from one groove to another, the slight increases of diameter of the cutter beds tends to retighten the wire. This is important, particularly where the end tension on the wire is only sufficient to maintain good working engagement of the first and last loops with the first and last grooves of each wheel. In such case, the very minute stretching of the wire by each circuit under the knives, would tend to loosen the intermediate loops, but this is compensated by the tightening due to the slight increase of peripheral length of the successive bed grooves.

After the wire has been operated upon at the last bed, 52h, it has been reduced to waste and passes under guide roller 53h to a winding reel 61.

Figure 12:
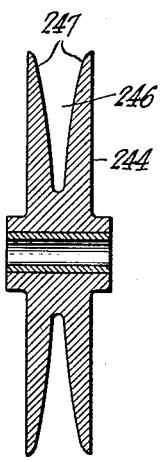
Fig. 12 is a sectional view of one of the guide rollers used in conducting the wire through the machine.

When the wire is fed from the reel 50 to the shaving machine (Figs. 4 and 5), it remains stationary on the shaft, or, in other words, does not feed laterally thereon. Accordingly, provision is made of means to guide the wire from the reel, which may include a roller 248 which is like the roller 244 (Fig. 12) having a deep groove in which the wire is guided. The roller 248 may be supported on a bar 249 carried by brackets 250 extending upwardly from the floor 67. From the roller 248, the wire is conducted to a similar roller 251, which is rotatably supported between fixed collars 252 on a bar 253 supported in foundations 254 and 255, upon which bed supporting frames 256 and 257 are located. From the last mentioned roller 251, the wire is conducted to the first groove in the guide roller 53 whence the wire extends to the bed 48. The walls of the hole, in the roller 248, through which the shaft 249 extends are curved so that said roller may traverse the rod and adjust itself, to the direction of the wire extending from the reel to the stationary guide roller 251, this direction varying as the wire unwinds from side to side of the reel.

The wheel bed 52 of each shaving unit may be secured to a shaft 258 supported in bearings 259 and 260 (Fig. 9) on the bed supporting frames 256 and 257, which are located respectively at the front and rear of the bed, said frames being connected to each other to increase their rigidity by bars 261.

The bed wheels are rotated by electric motors 262, each motor being connected through a coupling 263 with a gear transmission device 264 connected with the wheel shaft 258 by a coupling 265. The gear transmission device is designed to have a great speed-reducing, torque-multiplying ratio, so that the wheel bed may be driven at proper cutting speed, by means of the high speed motor 262. To control the speed of the wheel beds, I provide a separate rheostat connected in the field of each motor 262. The rheostat for the first wheel bed is manually operated and rheostats 266, for the succeeding wheel beds, are automatically operated, as will be explained. Each rheostat is located in an arch 267 formed in a foundation 268 extending upward from the floor 67 to support its motor 262 and the transmission device 264.

Figure 6:
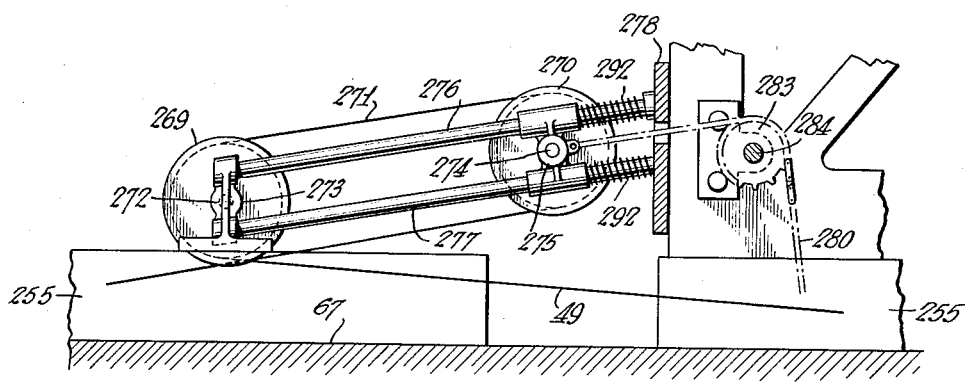
Fig. 6 is a detail sectional elevation illustrating the mechanism, including a dancer roller, for controlling the speed of the beds, the section being taken on the line 6—6 of Fig. 9.
Figure 7:
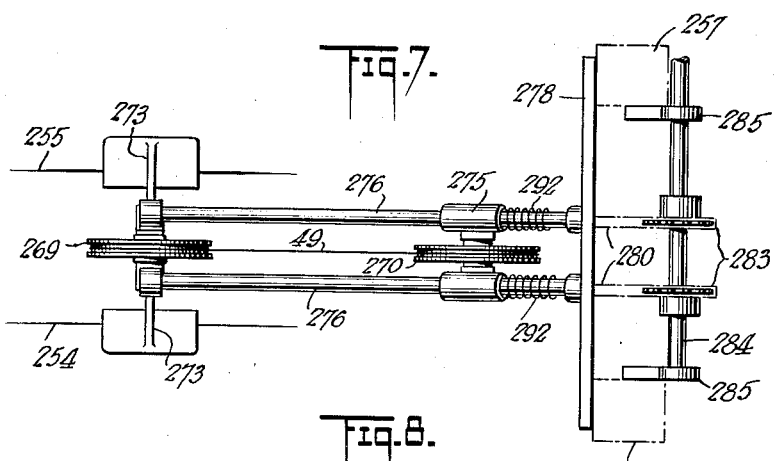
Fig. 7 is a top plan view of Fig. 6.

The means which prevents undue stress on the wire extending between the cutting units, may include a stationary roller 269 (Figs. 4, 6, 7 and 9) and a movable or dancer roller 270, around which rollers the wire is wrapped to form a take up loop 271. The stationary roller 269 may be rotatably supported by a shaft 272 on brackets 273 secured to the foundations 254 and 255. The dancer roller 270 may be supported by a shaft 274 in brackets 275, slidingly supported on upper guide rods 276 and lower guide rods 277, all of the guide rods being supported at their lefthand ends (Figs. 6 and 7) in the brackets 273 and at their righthand ends in a bar 278 secured to the drum supporting frames 256 and 257. The guide rollers may be grooved as shown to prevent rubbing where the wire crosses near the roller 269.

When the load is increased on any wheel, as for instance, the first wheel 52 (Fig. 4), which may result from varying hardness of the material in different parts of the wire, there is a tendency to reduce the speed of that wheel. The second wheel being then operating under normal conditions, at unreduced speed, the tension is immediately increased because the wire is being drawn from the loop faster than it is being supplied thereto. The increased tension draws the dancer roller 270 bodily toward the stationary roller 269, against the action of suitable tensioning means. Such means which may include an adjustable weight 279 operating on one or more sprocket chains 280, one end of each sprocket chain being secured to a fixed bar 281, and each chain extending downwardly around the guide roller 282 which carries the weight 279. From the guide roller 282, the chain extends upwardly over a sprocket 283 and is then connected to the bearing bracket 275 which supports the dancer roller 270. The sprockets 283 are secured to a shaft 284 supported in fixed brackets 285 secured to the frames 256 and 257. Thus the variations in tension and size of the take up loop cause the dancer roller 256 to move back and forth and such movements of the roller cause the weight 279 to rise and fall, the rise causing increased tension applied on the wire through the chain and dancer roll by reason of the increasing divergence of the chain loop in which the weight is suspended. Such movements also cause partial rotations of the shaft which are utilized to effect corresponding adjustments of the field rheostat of the motor which drives the next succeeding or second wheel 52a, thereby varying the speed of said second wheel by and in accordance with increase or decrease of speed of the first wheel. On the other hand, if the second wheel slows down while the first wheel keeps on at normal speed, the intervening take up loop lengthens, thereby allowing the weight to fall and decreasing tension and operating the rheostat to increase current supply to the second wheel and bringing it back to normal speed, regardless of its increased load. Thus the first or hand adjusted wheel sets the normal speed, controlling speed of the second wheel.

Figure 8:
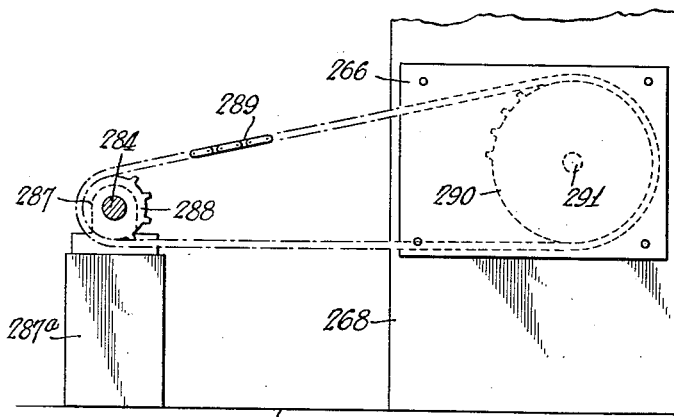
Fig. 8 is a detail sectional front view taken on the line 8—8 of Fig. 9.

To connect the shaft 284 with the rheostat 266, the shaft extends rearwardly where it is supported in a bearing 287 on a block 287a extending up from the floor 67. A sprocket 288 (Figs. 8 and 9) secured to said shaft, is connected by means of a chain 289 to a sprocket 290, secured to a shaft 291 of the rheostat. By turning this shaft in either direction, the rheostat is adjusted to increase or decrease the speed of the motor 262 and consequently the speed of the bed.

To prevent injury to the dancer roll mechanism when a break in the wire releases tension on the dancer roll, I provide buffer springs 292 coiled round the guide rods 276 and 277. These absorb the shock when the dancer roll is suddenly pulled towards the supporting bar by the then unbalanced pull of the weight 279.

The speed of each succeeding wheel throughout the machine, is controlled by a rheostat which is automatically adjusted by a take up means such as above described, located between it and the preceding wheel but the weights 279 controlling the successive take-ups are made of removable sections as shown so that they may be adjusted to the load and progressively decreased toward the exist of the machine, thereby to compensate for the decreasing load, due to easier bending of the wire as it gets thinner, and diminishing width of surface being cut; and to diminish the total tension so that the tension will not be too great for the diminishing cross-sectional strength of the wire. Otherwise, the thinned wire toward the end of the machine would be ruptured. Thus, differences in load, tensil strength, etc., are taken care of, while the differences of speed and resulting tension on the intermediate portions of the wire are utilized to adjust the power of the motor of each successive bed, thereby regulating its speed and closely limiting the variation of tension between successive beds.

The braking tension of the supply reel 50 may also be controlled automatically by the first bed wheel 52 by means including a dancer wheel 270 (see Figure 13) acted on by loop 271 of wire between the supply reel and the first traction wheel 52. When the tension upon the supply reel 50 increases beyond a predetermined point, movement of the dancer wheel 270 serves to operate the shaft 284 through the medium of the chain 280 and the sprocket wheel 283, and the shaft 284 through the medium of the chain 289 and sprocket 290 serves to adjust the rheostat 581, which may be connected in series with the field 489 of the motor 216, which is then being rotated by the wire and functioning as a generator as heretofore described.

It will be understood that the automatic rheostat 581 may be used either with or without the manual rheostat 552 and that the entire automatic control is preferable in certain cases for cutting certain kinds of material.

Figure 11:
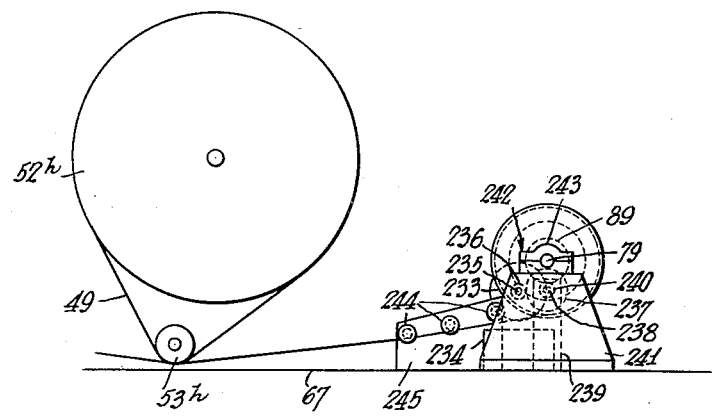
Fig. 11 is a diagrammatic front view showing the means for conducting the wire from the bed at the exit end of the machine to the waste winding reel or drum.

The final wheel may similarly control the speed of the winding reel at the exit end of the machine by means of an interposed take up loop and dancer roll mechanism, but the field rheostat operated thereby may be in series with a hand controlled rheostat operated from a central control station. As shown in Fig. 11, the motor 233, thus controlled, is supported on a foundation 234 on the floor 67. Said motor has on its shaft 235 a pinion 236 to drive a gear 237 secured to a shaft 238, which shaft may be supported on a bearing or bracket 239 extending upwardly from the floor 67. Secured to the shaft 238 is a pinion 240, which meshes with the gear 89 of the reel supporting shaft 79 to rotate the reel in a counterclockwise direction and thus wind the scrap wire thereon. The reel, upon which the scrap wire is wound, may be supported on brackets 241, one at each side of the reel, each bracket being provided with a bearing 242, including a bearing cap 243 which may be removed to facilitate the removal of the reel preparatory to removing the coil of waste wire therefrom.

To conduct wire from the guide rollers 53h associated with the last bed 52h, at the exit end of the machine, there may be provided a plurality of guide rollers 244, supported on a bracket 245, which bracket may be secured on the floor 67. Each of the guide rollers 244 may be provided with a deep groove 246, having curved sides 247 (Fig. 12) of apparently large radius, which conduct the wire to the bottom of the groove 246.

The tension to be regulated results from the differences in loads on the individual rotors and such loads, besides varying with the hardness of the wire, vary also with the numbers and kinds of knives that are in operation on the respective rotors.

Figure 10:
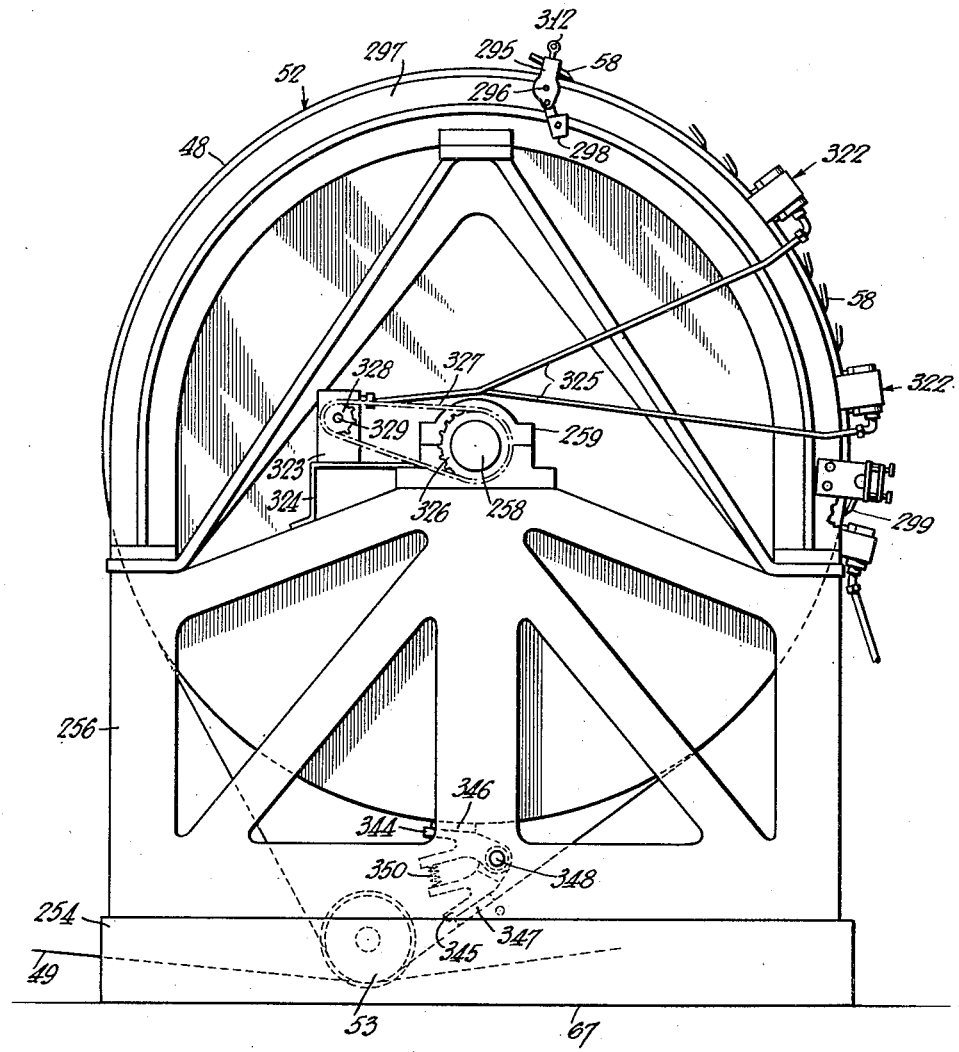
Fig. 10 is a front elevation of one of the shaving units, including the rotating traction bed, and illustrates the means for lubricating the wire; it also shows a fixed cutter to remove the slag or other undesirable material from the wire, and cleaners or wipers for the wire and bed.

The grooving knives, 58, may be like those in my above mentioned patent. They are arranged in groups around the periphery of the bed wheel as indicated in Fig. 10, where the size of the knives is somewhat exaggerated for clearness of illustration. Each knife is supported in a holder or bracket, 295, mounted to swivel about a pivot 296 on a semi-circular frame 297 extending adjacent the upper or cutter bed portion of wheel 52 and supported on the main frame 256. Each knife holder has connected thereto a weight, 298, which tends to force the cutting edge of the knife toward the wire which is supported in peripheral bed grooves.

When particularly hard spots in the wire reach the knives 58, said knives tend to rise or jump, with the result that they do not produce the desired quality of shaving and, in fact, do not do enough cutting of any kind to be at all effective in removing said hard spots. To take care of this, I provide for each bed a special cutter or planing knife, 299 (Fig. 10), located preferably in advance of the grooving knives and arranged to operate as a gauge cutter for removing any undue thickness of metal from each loop of wire, before it again passes to said grooving knives. The planing gauge knife is of sufficient width to engage all of the adjacent loops of wire on the bed and, when properly set, it does not touch the wire, so long as the grooving cutters 58 are functioning properly to remove the normal amount of metal. As soon as the attendant notices jumping of these cutters, he may swing them out of action where they may be held by suitable detents 312, which drop into apertures, not shown, in the periphery of the knife supporting frame 297. As soon as said grooving cutters are thrown out, the thickness of each loop reaching the planing knife 299 becomes correspondingly greater than normal, and the excess thickness that would ordinarily be removed by the grooving cutters 58 is presented to the special cutter 299, which planes a ribbonlike shaving from each loop, thus removing the undesirable material from the wire and reducing the wire to normal thickness. After this has been done, the wool producing cutters may again be rendered effective. The gauge planer is of importance herein, as one of the load varying factors in combination with which the tension regulator is used. It is claimed in other combinations in companion applications, particularly Ser. No. 297,314, filed August 3rd, 1928.

A lubricating or cooling agent, such as mineral oil, may be supplied to the cutters, by applying it to the strands of wire, and its operation or non-operation may effect variation in the loads of different rotors of the series. Such lubricating system may include a plurality of lubricating devices, 322 (Fig. 10), one in advance of each group of cutters 58. A pump 323 of any suitable construction is supported on a bracket 324 on the main frame 256 and operates to force the lubricating agent through supply pipes 325 to said lubricating device 322. Preferably, pump 323 operates only when the bed 48 is rotating. Its driving means includes a sprocket 326 on the wheel supporting shaft 258. This sprocket drives a chain 327 connected with a sprocket 328 which rotates the pump shaft 329 and thus operates the pump to force the lubricant through the supply pipe 325 to said lubricating devices.

Loads may vary with effectiveness of clearing and resulting perfect or imperfect fit of the wire against the bottoms of the traction beds. To clean these grooves and also the loops of wire, wipers 344 and 345, respectively (Fig. 10), are provided at each bed. The wiper 344 is provided with a pad 346 which lies against the periphery of the bed; said pad may be of comparatively soft material, such as felt, so as to embed itself in the grooves. The wiper 345 is also provided with a pad 347, of comparatively soft material, and the loops being spaced considerable distance from each other, the pads engage a considerable portion of the circumference of the wire. The wipers are pivotally supported on a rod 348 extending between the main frames. A spring 350 may be located between the wipers to separate them and force the wiper 344 against the periphery of the bed and the wiper 345 against the loops of the wire. It will be understood that the loops of wire extend from the bed at one side, downwardly towards and around the guide roller 53 and then upwardly back to the bed, and it is in this portion of the loops where the wipers are preferably located, so that the one may conveniently engage the periphery of the bed, while the other engages the surfaces of the wire that contact with the bed grooves. Thus the cleanness of grooves and the wires depends on the effectiveness of the wipers in removing shavings, chips, dirt and oil therefrom.

The lubricators are separately claimed in a divisional application, Ser. No. 297,318 filed August 3rd, 1928, and the wipers in Ser. No. 297,321 filed August 3rd, 1928.

To collect or gather the wool, in such manner as not to interfere with the tension regulators, there is provided at each bed a hood 351 (Fig. 9). Each hood is concave and extends rearwardly from the periphery of the wheel bed so as to receive the wool as it is blown away from the cutters by air jets (not shown) as in my above mentioned patent. The wool is conducted by said hood into pockets, one at each side thereof (not shown), where it accumulates. Each hood also serves as a protector for the bearing 260 of the bed shaft (Fig. 9).

The central electric control of all the traction rotors is not more fully here described as it is not material to the invention here claimed, but is the subject matter of another divisional application, Ser. No. 297,319 filed August 3rd, 1928.

To string or thread the wire around the series of beds, the end of the wire is fastened to strong flexible cable of the "aeroplane" type, which is passed around the first bed or wheel 52, the cable due to its flexibility seating itself in the bed grooves, more readily than the wire 49, particularly if the wire be heavy, the free end of the cable is pulled by hand, so that just the proper tension is produced on the wire, and is passed around the guide rollers 53, 269 and dancer rollers 270 and proceeds from bed to bed. As the operator keeps the cable taut by hand, all the beds and rollers of the cabled bed and the latter may be operated at a slow speed, about 10 to 30 feet per minute. As the wire wraps around a bed, the dancer roller preceding it moves away from the buffer springs 292 to a normal running position or the buffer springs may follow the dancer rolls as in Fig. 6. In case there should occur a break in the wire, the ends of the wire are brought together at a convenient place and welded end to end and the slack, if any, is taken out of the wire, after which the beds may again be started for cutting.

I claim:

1. In a machine for making metal wool from wire, including tensioned supply means, traction means at the exit end of the machine and cutting machine units operating in series between the supply means and the traction means, simultaneously on different portions of the same length of wire speed regulating mechanism comprising separate motors for driving said cutting units, means for controlling the speed of the first unit and means controlled by variations of relative speeds of successive units to set the speed of each succeeding unit in accordance with the speed of the unit that precedes it.

2. A machine for making metal wool from wire, including a cylindrical rotating bed having many parallel bed grooves in its periphery engaged by successive loops of the same wire all curving in the same direction, transfer means to guide the wire from one groove to the next adjacent one, a knife having a cutting edge extending transversely of the periphery of the bed, approximately in a plane parallel with the axis hereof, the diameter and peripheral length of each successive groove being greater than the preceding to keep the cut surfaces of all of the loops at the same level, in combination with take up means beyond the bed curving the wire in the same direction as said bed loop and applying end tension to hold the last loop of the wire in non-slip engagement in its bed groove.

3. A machine for making metal wool from wire, including knives and a plurality of power driven traction rotors around which the wire is wrapped to form successive loops all curving in the same direction, and means for regulating the relative speeds of the rotors including take up means curving the wire in the same direction as said bed loops and operating to elastically tension the wire between the rotors and means operated by the take up means to regulate the speed of one of said rotors by and in accordance with the speed of another of said rotors.

4. A machine for making metal wool from wire, including knives and a plurality of power driven traction rotors around which the wire is wrapped to form successive loops, and means for regulating the relative speeds of the rotors including take up means to elastically tension the wire between the rotors and means operated by the take up means to regulate the speed of one of said rotors by and in accordance with the speed of the preceding rotor.

5. A machine for making metal wool from wire, including a series of power driven shaving units arranged to shave different portions of the same wire simultaneously, each unit including shaving knives and a traction rotor for the wire, in combination with means responsive to the tension of the wire passing from one rotor to another and speed controlling means operated thereby to regulate the relative speeds of said rotors, one in accordance with another, each said responsive means including a take up for slack wire having a take up range sufficient to tension the varying length of slack necessary to actuate the speed controlling means and to maintain wire tension sufficient to prevent slip on the rotors, each successive take up being designed to maintain less tension on the wire than the preceding.

6. A machine for making metal wool from wire, including a series of power driven shaving units arranged to shave different portions of the same wire simultaneously, each unit including shaving knives and a traction rotor for the wire, in combination with means responsive to changes of relative speeds of successive units operating to adjust the speed of the succeeding unit in accordance with the speed of the preceding unit, to equalize their speeds.

7. In a machine for making metal wool from wire, including two rotary beds, the wire curving in the same direction around each bed and extending from one to the other, without reverse bending at any point, knives arranged at the periphery of each bed to engage the wire, independent driving means for each bed, elastic take up means flexing the wire between the beds without reversely bending it and means operable by said take up means to regulate the speeds of the beds.

8. A machine for making metal wool from wire, including two circular beds, the wire being looped around the first bed and then extending to the second bed around which the wire is also looped, without reverse bending, a plurality of knives arranged at the periphery of each bed to engage the wire, independent driving means for each bed, two rollers around which the extension of wire between the two beds is conducted to form a loop without reverse bending of the wire, means to floatingly support one of said rollers so that it may move towards or away from the other roller according to the change in tension of the loop of wire due to variation in the speed of the beds, and means operable by the floating roller and connected with the driving means of one bed to reduce its speed when the speed of the first mentioned bed is reduced.

9. In a machine for making metal wool from wire including two circular beds, the wire passing around the first bed and then extending to and around the second bed, knives at the periphery of each bed, independent driving means for each bed, means including a dancer roll to form a take up loop in the wire between the said beds, the size of the loop being varied by a variation in the speed of said beds, and means whereby said dancer roll applies greater tension on the loops and applies greater power on the driving means of the other of said beds, when the loop increases in size, and vice versa.

10. In a machine for making metal wool from wire including two circular beds, the wire passing around the first bed and then extending to and around the second bed, knives at the periphery of each bed, independent driving means for each bed, means to conduct the wire in a loop between said beds and to apply increasing tension on the loop as it decreases in size, the size of the loop being varied by a variation in speed of said beds, and synchronizing means connected with the driving means of one of said beds and operable by the loop forming means.

11. In a machine for making metal wool from wire including two circular beds, the wire passing around the first bed extending to the second bed and passing around the latter, a plurality of knives arranged at the periphery of each bed to engage the wire, an electric motor for each bed, a stationary roller, a dancer roller, the wire between the beds being conducted around the stationary roller and the dancer roller to form a complete uni-directional loop, the dancer roller being arranged to move towards or away from the stationary roller under varying tension, increasing with the size of the loop of wire due to variation of the load on one bed, a rheostat for the motor of the other bed and means operable by the dancer roller to adjust the rheostat to reduce the speed of the latter bed when the speed of the first mentioned bed is reduced.

12. In a machine for making metal wool from wire including two circular beds, the wire passing around the first bed and then extending to and around the second bed, knives at the periphery of each bed, electric motors, one for each bed, means including a dancer roll to form a loop between the said beds, the sizes of the loop varying with variation in load of one of said beds, means tensioning the dancer roll to tension the wire in the loop sufficiently to prevent slip on either of the adjacent beds, a rheostat, and means operable by said dancer roll to adjust the rheostat to vary the speed of one of said motors in accordance with the variation of the load on one of the beds.

13. In a machine for making metal wool from wire including two circular beds, the wire passing around the first bed and then extending to and around the second bed without reverse bending, knives at the periphery of each bed, driving means including an electric motor for each bed, means to form a complete loop in the wire between said beds without reverse bending, the size of the loop being varied by a variation in speed of said beds, a rheostat for one of said motors and means operable by the loop forming means to adjust the rheostat to synchronize the speed of said beds.

14. In a machine for making metal wool from wire including two circular beds, the wire being looped around the first bed and then extending to the second bed around which the wire is again looped, a plurality of knives arranged at the periphery of each bed to engage the wire, independent driving means for each bed, two rollers around which the extension of wire between the two beds is conducted to form a loop, a stationary bearing for one of said rollers, a sliding bearing for the other roller, guide rods for said sliding bearing, along which the second named roller may move towards or away from the other first named roller according to the change in the loop of wire due to variation in the load on the first named bed, and means operable by the sliding bearing and connected with the driving means of the second bed to reduce the speed of the second bed when the speed of the first named bed reduces the load on said bed.

15. In a machine for making metal wool from wire including two circular beds, the wire passing around the first bed, extending to the second bed and passing around the latter, a plurality of knives arranged at the periphery of each bed to engage the wire, independent driving means for each bed, a stationary roller, a dancer roller, the wire between the beds conducted around the stationary roller and the dancer roller to form a loop, the dancer roller being arranged to move towards or away from the dancer roller according to the change in the loop of wire due to variation in the pull on the wire, means against the action of which the dancer roller moves bodily, and means operable by the last named means to control the speed of the second bed in accordance with the load on the first named bed.

16. In a machine for making metal wool from wire including two circular beds, the wire passing around the first bed and then extending to and around the second bed, knives at the periphery of each bed to act on the wire, independent driving means for each bed, means to form a loop in the wire between said beds, the size of the loop being varied by a variation in speeds of said beds, a chain operable by the loop producing means, a weight associated with said chain to pull on the latter a sprocket operable by said chain, and means operable by said sprocket to control the speed of the driving means of one of said beds.

17. In a machine for making metal wool from wire including two circular beds, the wire being looped around the first bed and then extending to and around the second bed, a plurality of knives arranged at the periphery of each bed to engage the wire, two rollers around which the extension of the wire between the two beds is conducted to form a loop, means to floatingly support one of said rollers for movement toward or away from the other roller according to the change in the loop of the wire due to variation in speed of the beds, and means to yieldingly counterbalance tension of the loop tending to move the floating roller toward the stationary roller to hold the wire of preceding and following loops in non-slip engagement with their respective beds.

18. In a machine for making metal wool from wire including two circular beds, the wire passing around the first bed and then extending to and around the second bed, knives at the periphery of each bed to act on the wire, independent driving means for each bed, means to form an elastic loop in the wire extending between said beds, the size of the loop being varied by a variation in the speeds of said beds, the loop forming means including a movable roller, a support movable with said roller by which said roller is carried, a chain connected to said support, and a weight connected to said chain to urge the roller in one direction to keep the loop expanded and thus keep the wire taut on the adjacent portions of said beds.

19. A machine for making metal wool from wire, including supply and winding reels with an intermediate series of cutting units each including a traction wheel to support and feed the wire and knives in cutting relation thereto, in combination with a separate driving motor for each wheel, manually operable means common to all of said motors for predetermining a normal speed for all of them, and individual adjusting means controlled by the varying tension of the wire between adjacent wheels and operating to separately adjust the speed of the motor of the next succeeding wheel.

20. A machine for making metal wool, including a plurality of traction wheels to feed a wire, individual electric motors to drive said wheels, a generator to drive all of said motors, a rheostat for said generator to regulate the speed of the motors, individual rheostats, one for each motor, and means operable according to the speed of each bed, which may vary according to its load, to regulate the individual rheostat of the motor associated with the next succeeding wheel to synchronize the speed of said wheels.

21. A machine for making metal wool from wire, including tensioning supply means, end traction means, a number of intermediate wool cutting units each having a multiplicity if cutting knives and arranged in tandem to operate in series simultaneously on different portions of the same length of wire drawn from said supply means; separate motors and traction means for moving the wire in cutting relation to the knives of each of said units; means for setting one of said units at a standard operating speed suitable for all said units, in combination with separate auxiliary means for keeping the speed of all the units substantially at the speed of said standard speed unit; said auxiliary means including separate mechanisms engaging each length of the wire where it passes from and to each unit, each such mechanism being arranged to be controlled by variations of the tension of its length of wire, due to variations of the relative speed of the two adjacent units and each operating to adjust the speed of that one of its adjacent units which is more remote from said control unit, in accordance with the speed of that unit which is nearer said control unit, whereby all the units maintain the same average speed regardless of the work done on the wire by each of them.

22. The combination specified by claim 21 with the further feature that the length of wire between the tensioning supply means and the first cutting unit has a separate auxiliary speed control mechanism operating in the same way and with the same result as that specified for the lengths of wire between the cutting units.

23. The combination specified by claim 21 with the further feature that the length of wire between the end traction means and the last cutting unit has a separate auxiliary speed control mechanism operating in the same way and with the same result as that specified for the lengths of wire between the cutting units.

24. The combination specified by claim 21 with the further feature that the standard operating speed unit is the first cutting unit.

Signed at New York, in the county of New York and State of New York, this 31st day of July, A. D. 1928.

CROSBY FIELD.